United States Patent [19]

Hibbard et al.

[11] 4,378,561
[45] Mar. 29, 1983

[54] PARABOLIC REFLECTOR ANTENNA

[76] Inventors: Robert J. Hibbard; Carl V. Seibert, III, both of 1507 C Richmond Rd., Williamsburg, Va. 23185

[21] Appl. No.: 225,444

[22] Filed: Jan. 15, 1981

[51] Int. Cl.³ .......................................... H01Q 15/16
[52] U.S. Cl. .................................................. 343/912
[58] Field of Search ............... 343/840, 912, 915, 916

[56] References Cited

U.S. PATENT DOCUMENTS

| 3,296,685 | 1/1967 | Suliteanu | 343/912 |
| 3,438,045 | 4/1969 | Braccini | 343/912 |
| 3,832,717 | 8/1974 | Taggart | 343/915 |

Primary Examiner—Eli Lieberman
Attorney, Agent, or Firm—Littlepage & Webner

[57] ABSTRACT

A parabolic electromagnetic wave reflector is formed of glued together identical sectors of foam plastic, each with a parabolic curve formed by the upper side, and each with joint elements which serve also as stiffening ribs along their radial edges. A reflective surface is applied to the concave sides of the sectors. When the sectors are joined, they combine to form a parabolic dish.

4 Claims, 5 Drawing Figures

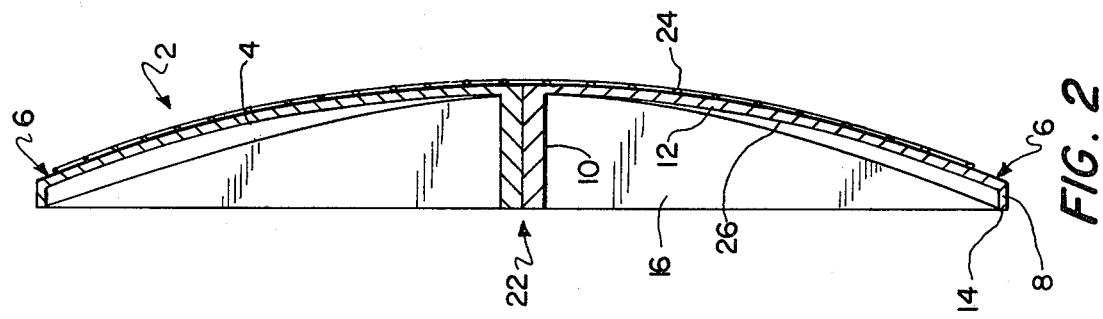
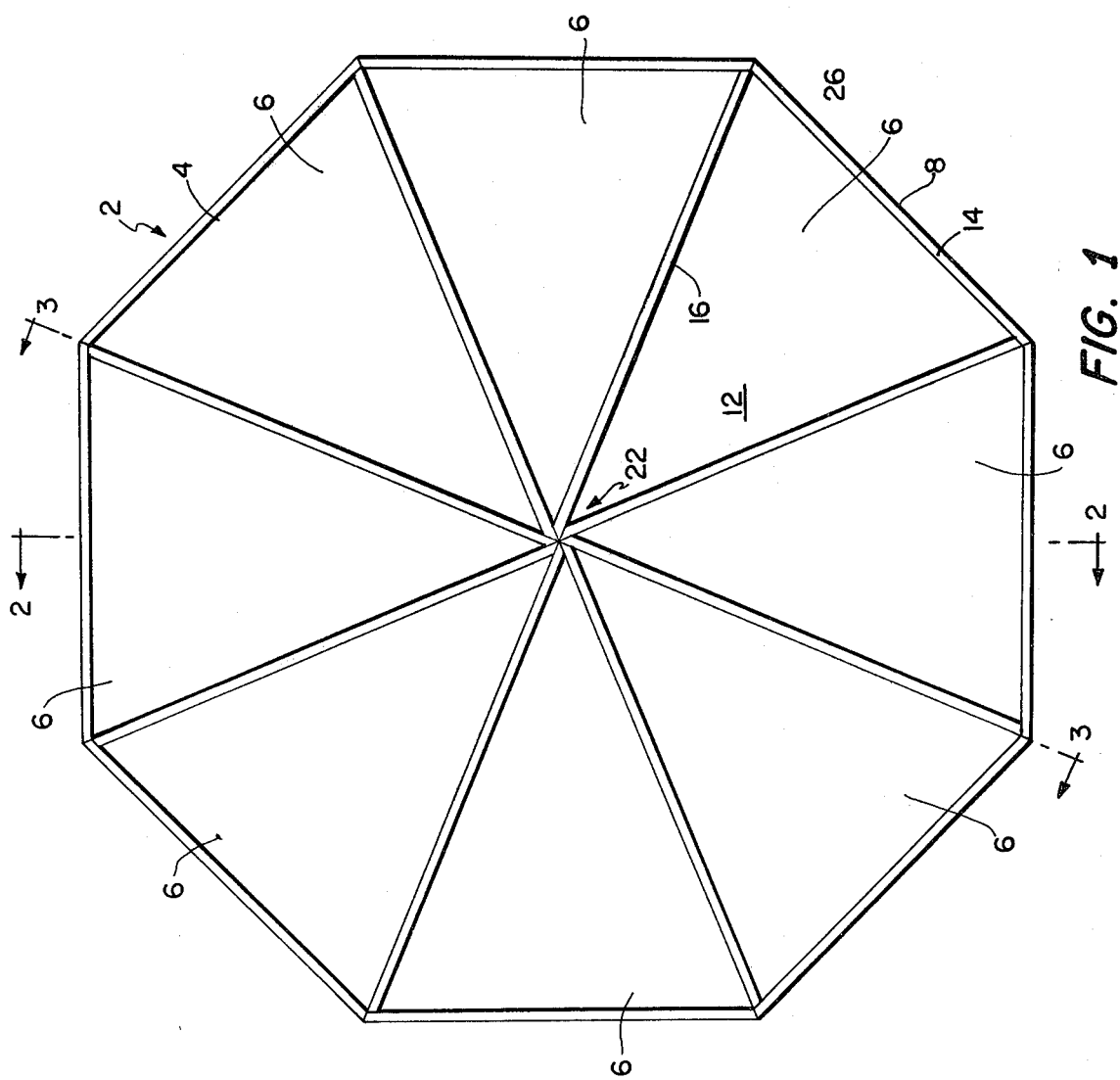

PARABOLIC REFLECTOR ANTENNA

FIELD OF THE INVENTION

Communications, radio wave, reflector or director (Class 343, Subclass 912).

PRIOR ART

U.S. Patent to Schepis U.S. Pat. No. 3,235,872; Suliteanu U.S. Pat. No. 3,296,685; Kielman U.S. Pat. No. 3,374,482; Payne U.S. Pat. No. 3,543,278; Lunden U.S. Pat. No. 4,148,039; and Withoos U.S. Pat. No. 4,171,563.

OBJECTS

Parabolic reflector antenna dishes fabricated of foam plastic which is transparent to electromagnetic waves, and which have reflective surfaces on their concave sides are well known. While the material offers advantages, such as being light and relatively inexpensive, the antenna formed of it, particularly the large dishes, tend to be cumbersome and fragile, so much so that the shipping and handling costs or the costs of in situ fabrication largely offsets the advantages. The primary object of this invention is to provide a parabolic reflector antenna dish assembled from identical pie slice-like sectors of molded foam plastic which sectors can be made of one or more pieces and stacked for packing and shipping, and which can be assembled at the point of use, be it terrestial or celestial, simply by fitting and glueing together the joints along the radial edges, the ends of the peripheral flanges, and the apical ribs. A further object is to provide joints formed by an upstanding flange or rib along a radial edge of each section, which rib contains a groove for receiving a tongue along a radial edge of an adjacent sector. The ribs and the tongue and groove joints constitute truss-like stiffening elements. In addition it is intended to mold grids along the non-concave or undersides of the sectors to further strengthen and stiffen the sectors.

These and other objects will be apparent from the following specification and drawings, in which;

FIG. 1 is a top plan view of an assembled dish;

FIG. 2 is a vertical cross-section along the line 2—2 of FIG. 1, looking in the direction of the arrows;

Figure 5:
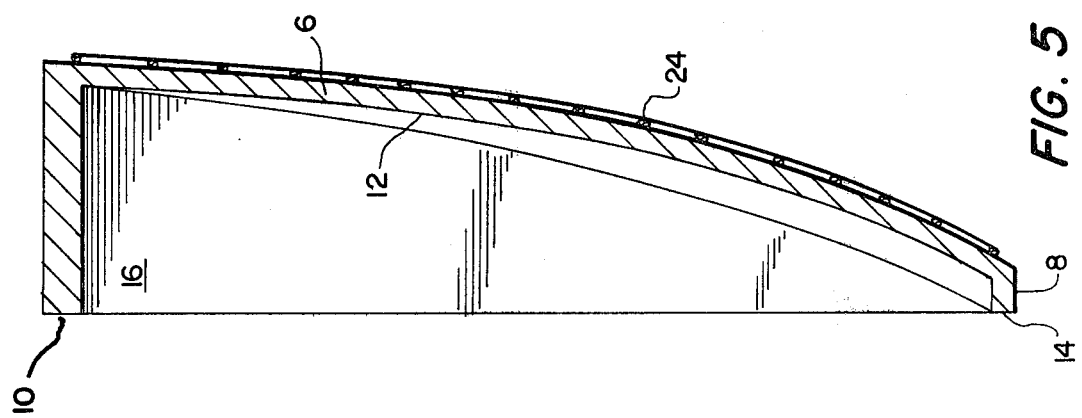
FIG. 5 is a vertical cross-section along the line 5—5 of FIG. 4.

Referring now to the drawings, in which like reference numerals denote similar elements, the parabolic reflector antenna 2 is essentially a dish 4 formed of pie slice-like sectors 6. Since the sectors are identical, only one will be detailed. They are all formed of a foam plastic such as "PELLESPAN," "DYLITE," or the like material which is virtually transparent to electromagnetic wave energy, and which therefore entails no loss or absorption of the electromagnetic wave energy which is received from aloft, as from a satellite. Antennae of this general type, are well known and are conventionally provided with suitable supporting and aiming structure, and which, in addition to the dishes themselves, are used in connection with a receiving element disposed at the focal point of the parabola.

The sectors 6 are formed with straight peripheral edges 8 in order to reduce the size of the mold in which they are formed. Their upper surfaces 12 are formed on parabolic curves which, when the sectors are combined, form a parabolic reflector having a reflective focal point common to all the sectors. Along the outer edges of the sectors are upstanding peripheral flanges 14 which stiffen the periphery, and along one radial edge of each segment is a rib 16 containing a sidewise-open groove 18 into which fits a tongue 20 along the radial edge of an adjacent sector. When the ends 10 of the ribs of the sectors are glued together, they form a firm center post 22. Reflective conductive surfaces 26 of metal foil are applied to the upper concave sides of the sectors. Other types of reflective, conductive surfaces may be affixed.

It will be understood that the size of a dish of this type may range up to 20 feet or more in diameter or it may be considerably smaller if used for receiving energy from very from very powerful sources.

Figure 4:
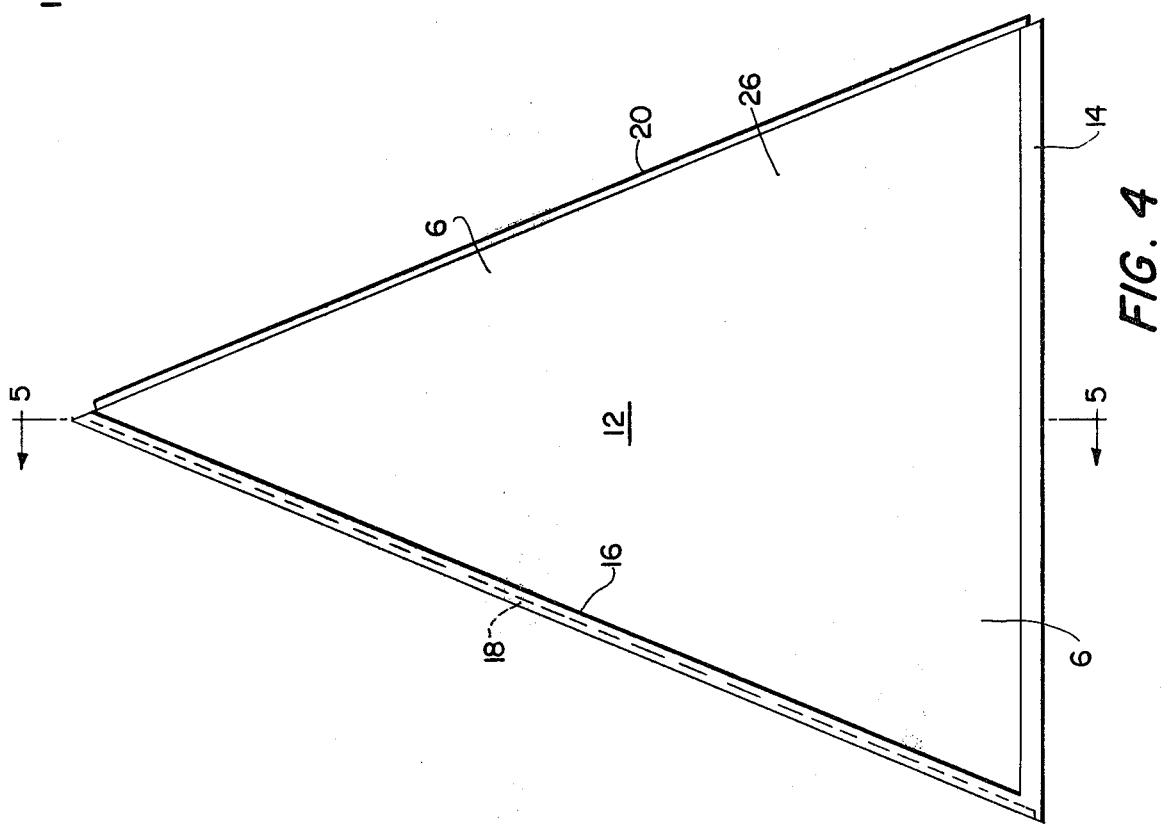
FIG. 4 is a top plan view of one of the segments.
Figure 3:
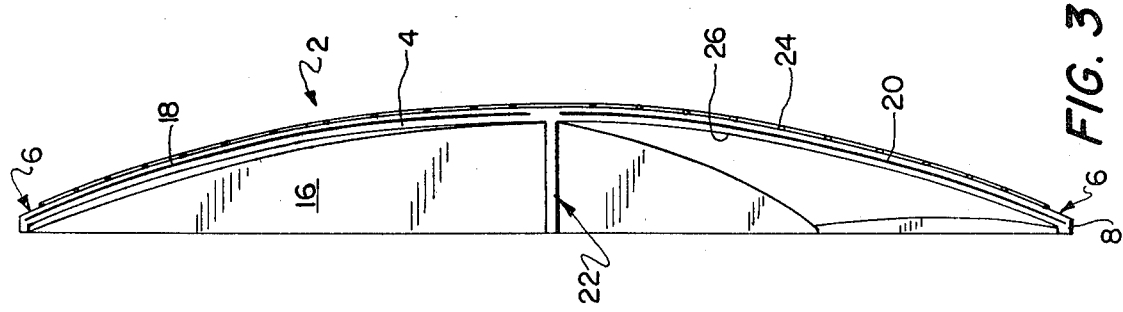
FIG. 3 is a vertical cross-section along the line 3—3 of FIG. 1.

It will be apparent from the drawings that the sectors, such as the one shown alone in FIG. 4 of the drawings, can be stacked and packaged for shipping, as that only glue for the joints is needed for assembling the sectors into a complete dish.

The reflector has uses also for acoustical purposes or for concentrating solar energy, in which cases the surfaces need only to be reflective and not necessarily conductive.

We claim:

1. A parabolic reflector comprised of a plurality of similar sectors of foam plastic,
   each of said sectors having a periphery and an apex and a concave surface formed along parabolic curves extending between said periphery and apex,
   joint means along radial edges of said sectors for joining the same together to form a dish-shape body,
   a foam plastic generally flat stiffening rib upstanding from and integral with the concave side of each sector and extending radially from the periphery to the apex thereof,
   and reflective surface means on the concave sides of said sectors providing for the joined-together sectors a common focal point of reflected wave energy, said ribs being along radial edges of said sectors.

2. A parabolic reflector as claimed in claim 1, the ribs on said sectors having sidewise-open grooves therein, each of said sectors having along the other radial edge thereof a tongue for engaging in the groove in the rib of an adjacent sector.

3. A parabolic reflector as claimed in claim 1, each of said sectors having a peripheral flange integral with the radially outward end of the stiffening rib thereon.

4. A parabolic reflector comprised of a plurality of similar sectors of foam plastic,
   each of said sectors having a periphery and an apex and a concave surface formed along parabolic curves extending between said periphery and apex,
   joint means along radial edges of said sectors for joining the same together to form a dish-shape body,
   a foam plastic generally flat stiffening rib upstanding from and integral with the concave side of each sector and extending radially from the periphery to the apex thereof,
   and reflective surface means on the concave sides of said sectors providing for the joined-together sectors a common focal point of reflected wave energy,
   the stiffening rib on each of said sectors having adjacent the apex thereof an upstanding end for joining with the upstanding rib ends of the other sectors to provide a unitary column at the center of the body.

* * * * *